United States Patent
Satyamsetti

(10) Patent No.: US 12,367,288 B2
(45) Date of Patent: Jul. 22, 2025

(54) SECURELY PROVISIONING SECRETS IN AUTHENTICATION DEVICES

(71) Applicant: Google LLC, Mountain View, CA (US)

(72) Inventor: Vidya Satyamsetti, Bothell, WA (US)

(73) Assignee: Google LLC, Mountain View, CA (US)

( * ) Notice: Subject to any disclaimer, the term of this patent is extended or adjusted under 35 U.S.C. 154(b) by 309 days.

(21) Appl. No.: 17/970,198

(22) Filed: Oct. 20, 2022

(65) Prior Publication Data
US 2024/0134986 A1 Apr. 25, 2024
US 2024/0232361 A9 Jul. 11, 2024

(51) Int. Cl.
*G06F 21/57* (2013.01)
*G06F 21/44* (2013.01)

(52) U.S. Cl.
CPC ............ *G06F 21/572* (2013.01); *G06F 21/44* (2013.01); *G06F 21/575* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 2020/0193065 A1 | 6/2020 | Smith | |
| 2020/0322134 A1* | 10/2020 | Duval | G06F 21/44 |
| 2022/0038272 A1 | 2/2022 | Hershman et al. | |
| 2022/0067162 A1* | 3/2022 | Jeansonne | G06F 21/572 |
| 2022/0198070 A1* | 6/2022 | Hunt | G06F 21/57 |
| 2022/0382863 A1* | 12/2022 | Weizman | G06F 21/568 |

OTHER PUBLICATIONS

DICE Layering Architecture, Mar. 9, 2020, Trust Computing Group, pp. 1-30 (Year: 2020).*
Extended European search report for European Appl. No. 23174793.2 dated Feb. 23, 2024. 10 pages.
Tao, Z., et al., "DICE: A Formally Verified Implementation of DICE Measured Boot", USENIX, The Advanced Computing Systems Association, Apr. 2021. pp. 1-17.

* cited by examiner

*Primary Examiner* — Clayton R Williams
(74) *Attorney, Agent, or Firm* — Lerner David LLP

(57) ABSTRACT

The present disclosure provides for increased security of root of trust (RoT) chips by preventing malicious provisioning. Unique device secrets (UDS) can only be provisioned securely by trustworthy hardware or trustworthy firmware. Entities other than the trustworthy hardware and trustworthy firmware do not have access to a composite device identifier (CDI) generated using the UDS and firmware measurements.

18 Claims, 5 Drawing Sheets

SECURELY PROVISIONING SECRETS IN AUTHENTICATION DEVICES

BACKGROUND

Root-of-Trust (RoT) devices have a variety of applications as a trusted computing base in various system integrations. A first mutable code on a device with a Device Identifier Composition Engine (DICE) wields a device key that serves as the identity of the device. The device key is derived from a Composite Device Identifier (CDI). The CDI is derived from secret key material called Unique Device Secrets (UDS) accessible only to DICE and other inputs like code, configuration, etc.

RoT devices are notably used to provide trustworthy attestations. The attestation is rooted in a device key. The device key is an asymmetric key accessible only to the first mutable code that runs on the device. It may attest to other firmware on the device using the device key. The device key is itself derived from a composite device identifier (CDI). For example:

Device_key{pub, priv}=Derive_Asymmetric_key_pair (Algorithm, CDI).

The DICE mechanism stipulates that CDI be derived from UDS using measurements over the first mutable code by the hardware. For example:

CDI=KDF(UDS, measurements).

The UDS itself is a unique secret provisioned to the RoT device at manufacturing time or ownership time and remains constant for the lifetime of the RoT device.

For an RoT device with DICE, securely provisioning the UDS can be a challenge. For example, attackers can access a blank device without UDS provisioned yet, and maliciously provision it. The attacker can then mix the maliciously provisioned RoT device into the supply chain of the RoT owner. The attacker firmware provisions a weak UDS or known UDS or emits the UDS out. Thus, the UDS on the RoT device is leaked and the RoT device cannot be trusted anymore. The RoT owner gets the maliciously provisioned RoT device but the attestations be receives from the RoT device may be intercepted by the attacker and replaced with fake attestations because the attacker controls the UDS and thus all CDI and device keys on the RoT device.

BRIEF SUMMARY

The present disclosure provides a mechanism for protecting against malicious provisioning of RoT devices. According to the present disclosure, the UDS is provisioned securely either by trustworthy hardware or trustworthy firmware. No entity except the hardware and trusted firmware can access the CDI before, during or after provisioning the device.

In DICE implementations where firmware on the device can provision the UDS on the device or can access the UDS as it is provisioned, the firmware must first be cryptographically verified by hardware against known good keys before launching it and only then should it be allowed to provision UDS.

Even when UDS can be provisioned by the hardware without being seen by the firmware, hermetically or upon request by the current firmware, DICE implementation must make sure that the current running firmware only gets access to a CDI based on measurements of the firmware performed by the hardware at the time of booting the firmware.

One aspect of the disclosure provides a method of ensuring secure provisioning of a root-of-trust device, comprising verifying, using hardware on the root-of-trust device, firmware to be used for provisioning. If the firmware is verified, the firmware is allowed to write unique device secrets. If the firmware is not verified, the hardware takes one or more security measures, such as refusing to boot, locking access to storage areas, or refusing to run the firmware.

Another aspect of the disclosure provides a method of ensuring secure provisioning of a root-of-trust device, comprising writing, by hardware on the root-of-trust device, unique device secrets, detecting, by the hardware on the root-of-trust device, a request from firmware for provisioning, performing, by at least one of the hardware or a device identifier composition engine, one or more security measures preventing the firmware from reading provisioned unique device secrets or any composite device identifier that is not meant to be accessed by the loaded firmware.

Yet another aspect of the disclosure provides a system for ensuring secure provisioning of a root-of-trust device, comprising memory and one or more processors in communication with the memory, the one or more processors configured to write unique device secrets or verify firmware to be used for writing unique device secrets, and prevent unintended or unverified firmware from provisioning.

DETAILED DESCRIPTION

The present disclosure provides for increased security of RoT devices by preventing malicious provisioning. The UDS can only be provisioned securely by trustworthy hardware or trustworthy firmware. Entities other than the trustworthy hardware and trustworthy firmware do not have access to the UDS.

In a first implementation, firmware on the RoT device can provision the UDS on the device or access the UDS as it is provisioned. The firmware is first cryptographically verified by hardware against known good keys. Once verified, the firmware may be launched and allowed to provision UDS.

In a second implementation, hardware can provision the UDS on the RoT device. The hardware can perform such provisioning hermetically or upon request by firmware. In this implementation, the current running firmware can only access a CDI based on measurements of the firmware performed by the hardware at the time of booting the firmware.

Figure 1:
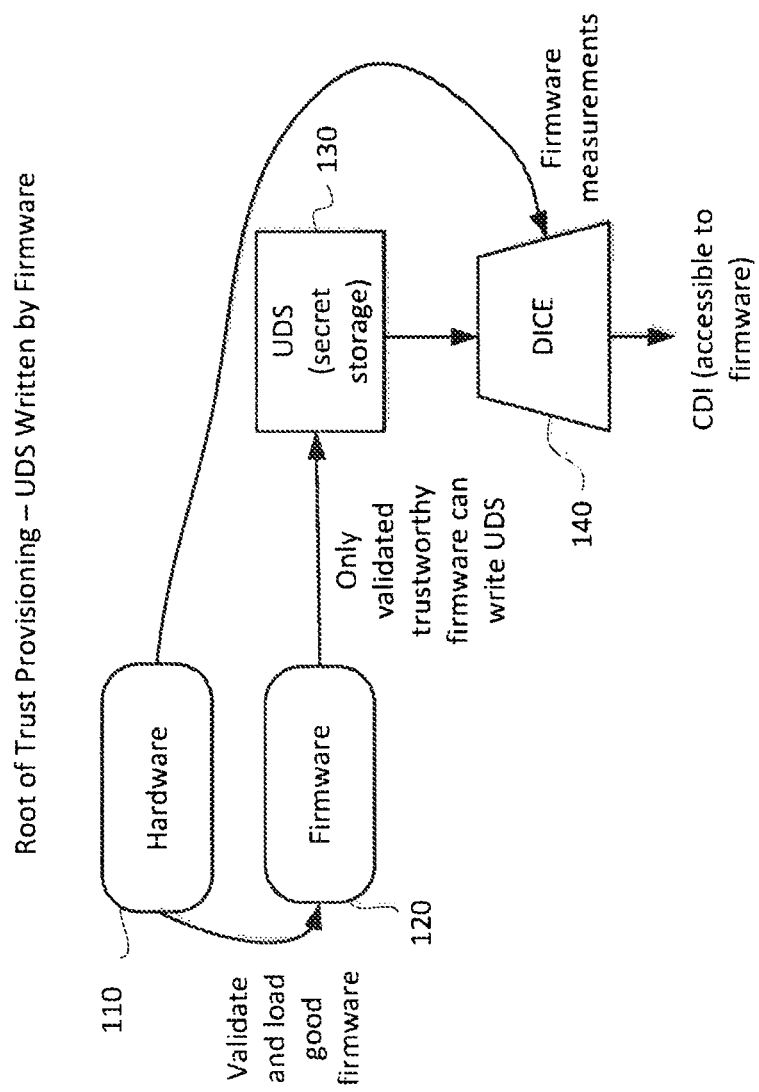
FIG. 1 is a schematic diagram illustrating provisioning of a RoT device with UDS written by firmware, according to aspects of the disclosure.

FIG. 1 is a schematic diagram illustrating provisioning of a RoT device with UDS 130 written by firmware 120. Such firmware 120 may be on an external memory device, such as a flash drive, or an internal memory location. Provisioning on the device can be done only by a cryptographically verifiable trustworthy firmware 120. For example, a security feature designed to prevent malicious software from loading at startup of a computing device, such as Secure Boot, can be implemented on the device. The security feature is enabled and enforced by hardware 110 before letting any firmware 120 that can provision the device boot. For example, hardware 110 on the device, such as maskROM (instructions from a read-only memory (ROM)) for boot-up, can cryptographically verify the firmware 120 against a known good key before letting it out of boot.

Once the firmware 120 is verified, it can write UDS 130. DICE 140 uses the UDS 130 and firmware measurements to generate a CDI. DICE 140 may be, for example, a separate hardware cryptographic module. The firmware measurements can include, for example, measurement of the first mutable code. In some examples the firmware measurement can additionally include hardware state and configuration data. The CDI may be accessible to the firmware 120.

If the hardware 110 cannot verify the firmware 120 against a known good key, it may take security measures. Such security measure can include, for example, refusing to boot, locking access to UDS storage areas, or any other action that would prohibit malicious provisioning. In this regard, if an attacker runs firmware that can maliciously provision and leak the UDS, hardware 110 will refuse to run that firmware.

Figure 2:
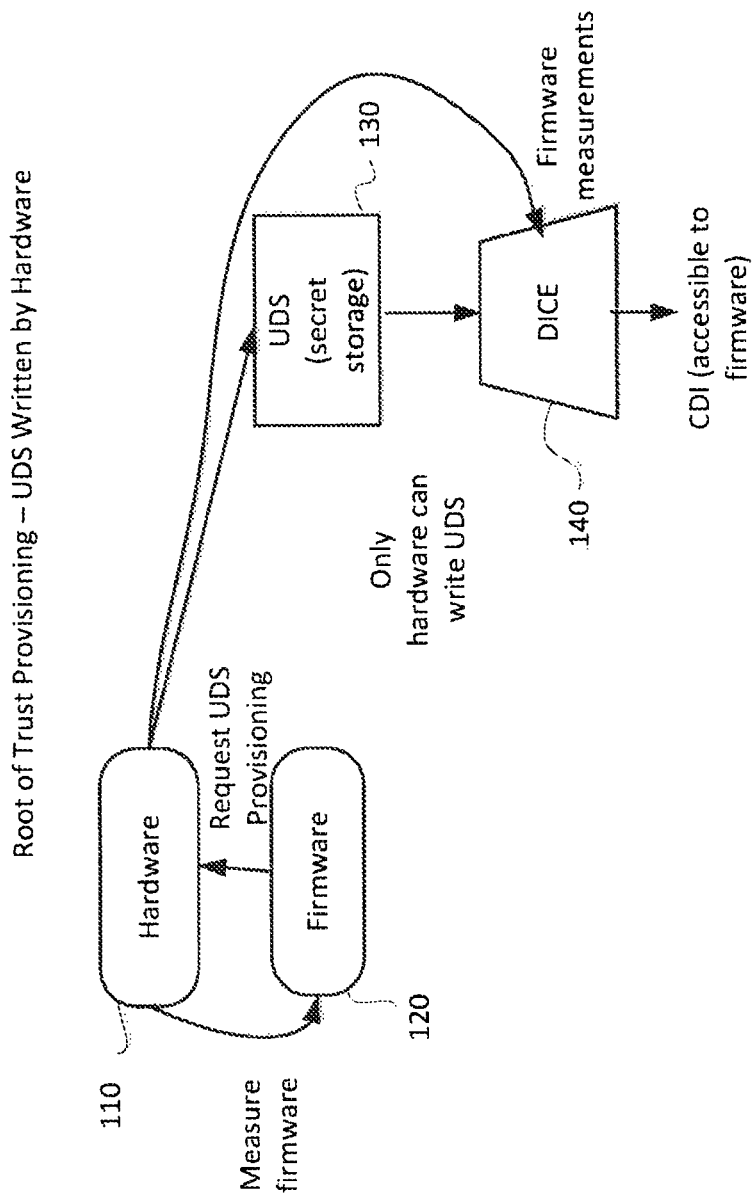
FIG. 2 is a schematic diagram illustrating provisioning of a RoT device with UDS written by hardware, according to aspects of the disclosure.

FIG. 2 is a schematic diagram illustrating an example of provisioning of a RoT device with UDS 130 written by hardware 110. In this example, the DICE 140 is implemented in such a way that even when UDS 130 is requested to be provisioned by firmware 120 on the device, the firmware 120 will never have access to the UDS 130 or any derived secret. Rather, only hardware 110 can write the UDS 130.

Firmware 120 may request UDS 130 provisioning, such as by sending a request to hardware 110. When the hardware 110 detects the request for UDS 130 provisioning, hardware 110 and/or DICE 140 on the device can take one or more actions to ensure that the device is secure. For example, such action may include resetting the device after UDS 130 is provisioned, only allowing UDS 130 provisioning when Secure Boot has been enabled and enforced by the hardware 110 before letting the firmware 120 that is requesting UDS 130 provisioning to boot, or other actions. In other examples, the action may include having the DICE 140 on the device be locked by the hardware 110 when UDS 130 is not provisioned, so even when firmware 120 provisions the UDS 130, DICE 140 is not available until a next reset. In further examples, such action may include DICE 140 automatically taking the measurements made at the time of boot, whether they are validated by hardware 110 or not, and automatically creating a CDI corresponding to the firmware 120 that booted. While these are a few examples of actions that can be taken, other mitigations may be taken to ensure that CDI or UDS is never accessible to a firmware other than the one it is intended for.

Figure 3:
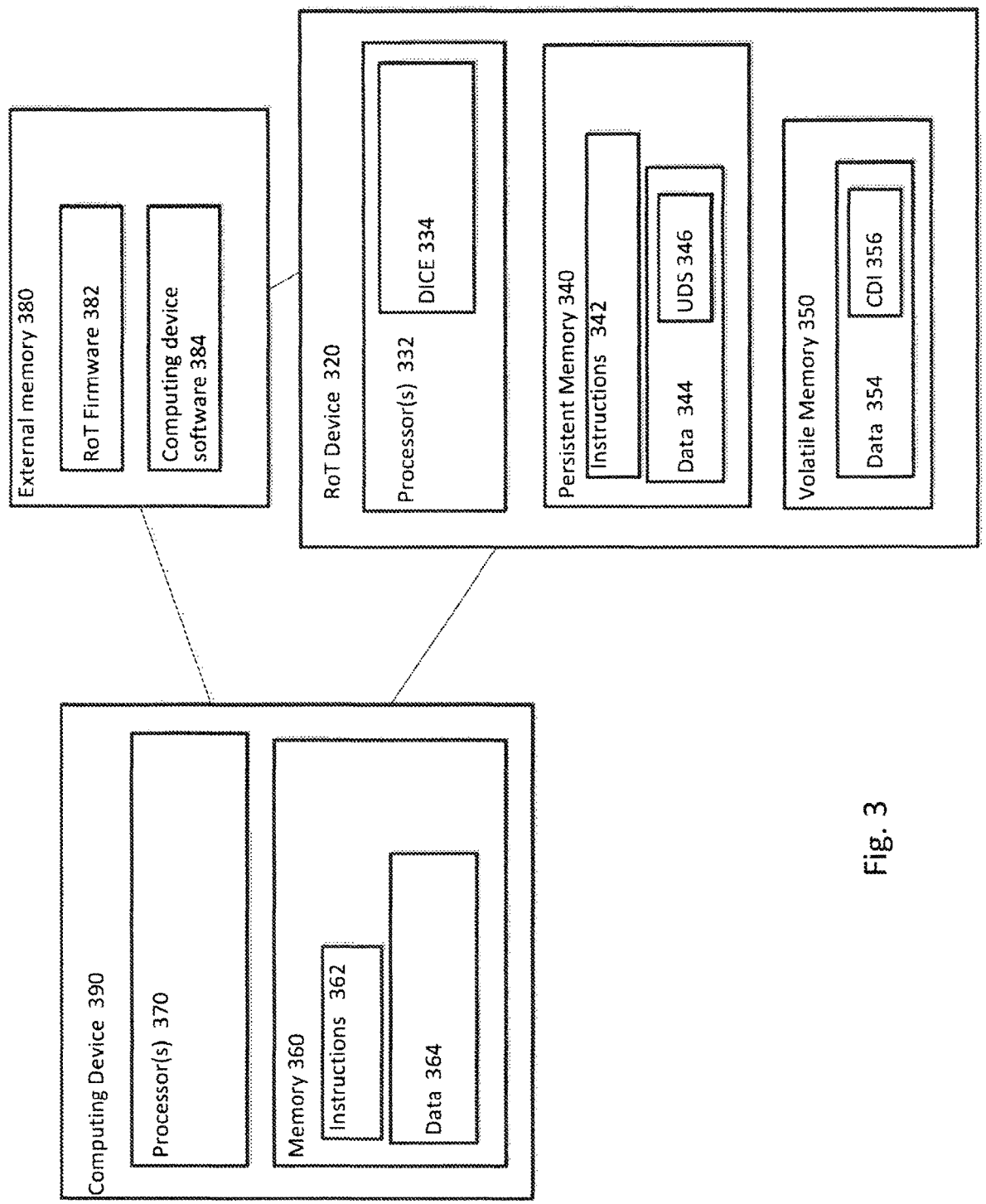
FIG. 3 is a block diagram of an example system according to aspects of the disclosure.

FIG. 3 illustrates an example computing environment that may be used for secure provisioning of UDS on a RoT device. In particular, the computing environment may include a computing device 390, such as a personal computing device, a root-of-trust (RoT) device 320, such as a secure enclave or a trusted platform module, and an external memory 380, such as a flash drive. All software on computing device 390 is measured by the Root-of-Trust (RoT) device 320, and the UDS on the RoT device is combined to form a CDI that is used to attest to the measurements of software on the computing device.

The computing device 390 includes one or more processors 370 and memory 360. The processors 370 can be any conventional processors, such as commercially available CPUs. Alternatively, the processors can be dedicated components such as an application specific integrated circuit ("ASIC") or other hardware-based processor. Although not necessary, the computing device 390 may include specialized hardware components to perform specific computing processes.

The memory 360 can store information accessible by the processor 370, including instructions 362 that can be executed by the processor 370. Memory can also include data 364 that can be retrieved, manipulated or stored by the processor 370. The memory 360 may be a type of non-transitory computer readable medium capable of storing information accessible by the processor 370, such as a hard-drive, solid state drive, tape drive, optical storage, memory card, ROM, RAM, DVD, CD-ROM, write-capable, and read-only memories. The processor 370 can be a well-known processor or other lesser-known types of processors. Alternatively, the processor 370 can be a dedicated controller such as an ASIC.

The instructions 362 can be a set of hardwired instructions executed directly, such as machine code.

The data 364 can be retrieved, stored or modified by the processor 370 in accordance with the instructions 362. For instance, although the system and method is not limited by a particular data structure, the data 364 can be stored in computer registers, in a relational database as a table having a plurality of different fields and records, or XML documents. The data 364 can also be formatted in a computer-readable format such as, but not limited to, binary values, ASCII or Unicode. Moreover, the data 364 can include information sufficient to identify relevant information, such as numbers, descriptive text, proprietary codes, pointers, references to data stored in other memories, including other network locations, or information that is used by a function to calculate relevant data.

Although FIG. 3 functionally illustrates the processor, memory, and other elements of the computing device 390 as being within the same block, the processor, memory, or other components can actually comprise multiple processors, memories, etc. that may or may not be stored within the same physical housing. For example, the memory can be a hard drive or other storage media located in housings different from that of the server 320. Accordingly, references to a processor, computer, computing device, or memory will be understood to include references to a collection of processors, computers, computing devices, or memories that may or may not operate in parallel.

RoT device 320 may also include one processors 332 and memory, similar to the computing device 390. In the example shown, the RoT memory includes persistent memory 340, including instructions 342 and data 344, and volatile memory 350, including data 354.

In the example shown, the RoT processors 332 may include DICE 334. DICE 334 is the root of trust for measurement and is inherently trusted. DICE 334 may be a hardware/firmware capability that uses UDS 346 to generate a cryptographically unique value, called a composite device identifier (CDI) 356. The UDS 346 is a statistically unique, device-specific, secret value. The UDS 346 may be generated externally and installed during manufacture, or generated internally during device provisioning. The UDS 346 may be stored in non-volatile memory, such as persistent memory 340. DICE 334 may establish that the RoT device 320 boots the first mutable code provided by a manufacturer of the device 320. For example, DICE 334 measures the first mutable code on the RoT device 320, and combines this measurement with device-specific UDS 346 to form the CDI

356. The CDI 356 is unique to the device and also to the combination of the device, the cryptographic identity of the device's First Mutable Code and, optionally, configuration data. The CDI 356 may be stored in volatile memory 350.

External memory 380 may include, for example, RoT firmware 382 and computing device software 384. While the RoT firmware 382 and computing device software 384 are shown as residing on external memory 380 in this example, it should be understood that in other examples either or both of the firmware 382 and software 384 may reside in an internal memory location in the computing device 390.

The processor 332 of the RoT device 320 loads and runs instructions 342, such as read only memory (ROM) instructions in persistent memory 340. The ROM instructions verify and load the RoT firmware 382 from external memory 380. The CDI 356 is derived based on such verification. The loaded RoT firmware 382 measures computing device software 384 before letting the computing device 390 run any software. Upon request, a device key derived from the CDI 356 is used to sign the measurements made. The computing device 390 is then allowed to run the software. The computing device 390 loads its instructions 362, such as ROM instructions, and loads the RoT firmware 382.

According to one example, a user may seek authentication of the computing device software 384. The computing device 390, in turn, may forward a request for attestation of the computing device's measured software 384 to the RoT device 320. According to another example, the user may request that the RoT device 320 attest to the computing device's measured software 384.

It should be understood that the computing environment described above in connection with FIG. 3 is merely one example, and that other computing environments are also possible.

Further to the example systems described above, example methods are now described. Such methods may be performed using the systems described above, modifications thereof, or any of a variety of systems having different configurations. It should be understood that the operations involved in the following methods need not be performed in the precise order described. Rather, various operations may be handled in a different order or simultaneously, and operations may be added or omitted.

Figure 4:
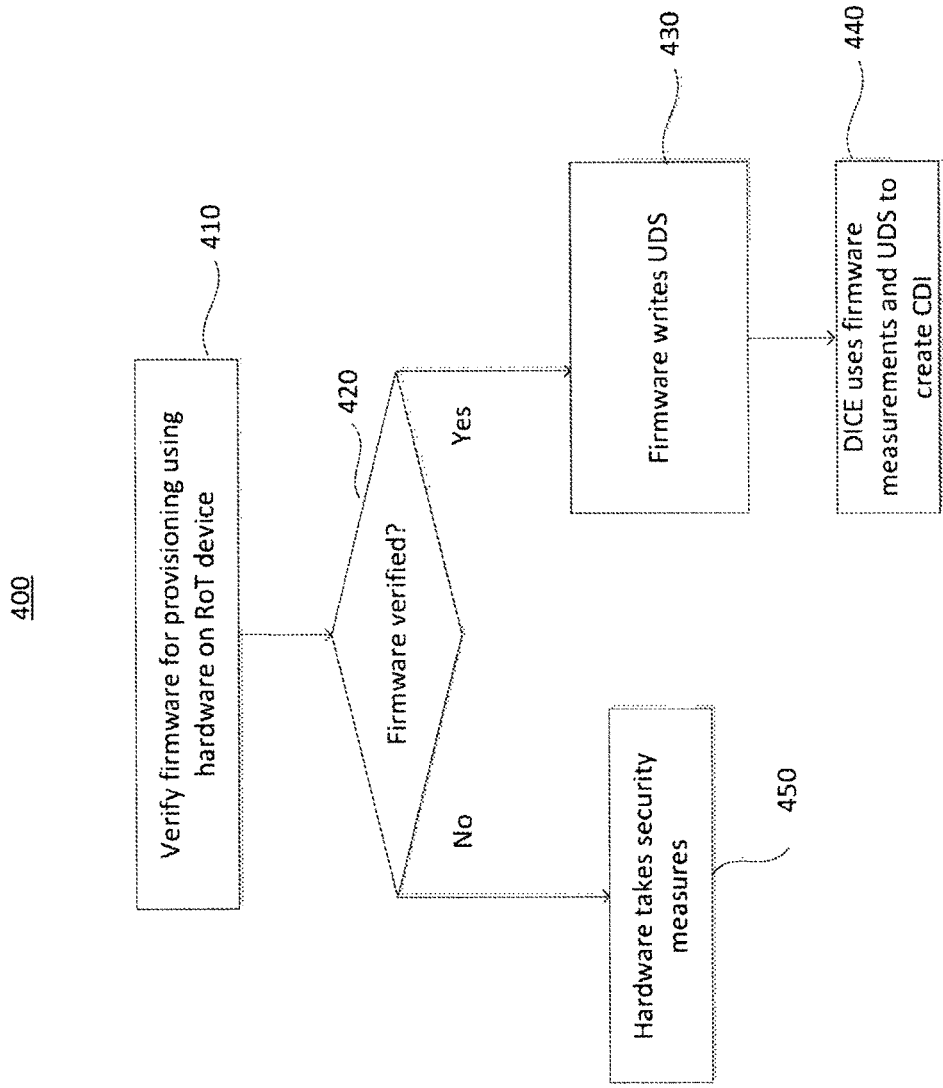
FIG. 4 is a flow diagram illustrating an example method according to aspects of the disclosure.

FIG. 4 illustrates an example method 400 of ensuring secure provisioning using firmware.

In block 410, firmware to be used for provisioning a root of trust (RoT) device is verified using hardware on the device. For example, a security feature designed to prevent malicious software from loading at startup of a computing device, such as Secure Boot, can be implemented on the device. The security feature is enabled and enforced by hardware on the device before letting any firmware that can provision the device boot. For example, boot ROM on the device can cryptographically verify the firmware against a known good key before letting it out of boot.

In block 420, it is determined whether the firmware was verified. For example, the hardware on the device may determine whether the firmware was able to be verified or not.

If the firmware was verified, in block 430 the firmware writes the UDS. In block 440, the DICE uses the UDS to generate a CDI. For example, the DICE may obtain firmware measurements, such as measurement of a first mutable code. The DICE may use the UDS and the firmware measurements to generate the CDL.

If the firmware was not verified, in block 450 the hardware on the device may take security measures. Such security measure can include, for example, refusing to boot, locking access to storage areas, or any other action that would prohibit malicious provisioning. In this regard, if an attacker runs firmware that can maliciously provision and leak the UDS, hardware will refuse to run that firmware.

Figure 5:
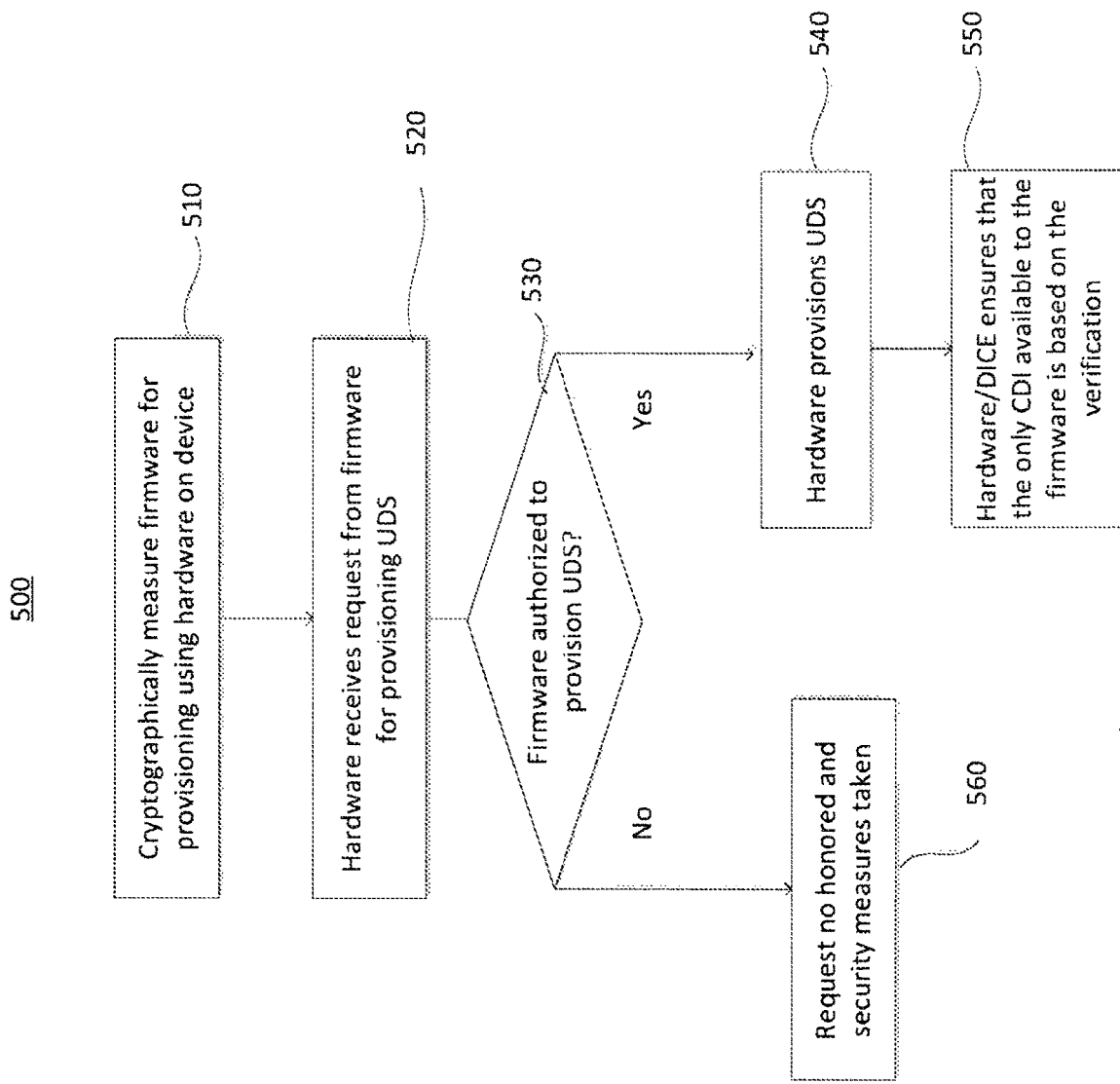
FIG. 5 is a flow diagram illustrating another example method according to aspects of the disclosure.

FIG. 5 illustrates an example method 500 ensuring secure provisioning of a RoT device using hardware.

In block 510, firmware to be used for provisioning a root of trust (RoT) device is cryptographically measured using hardware on the device. For example, a security feature designed to prevent malicious software from loading at startup of a computing device, such as Secure Boot, can be implemented on the device. The security feature is enabled and enforced by hardware on the device before letting any firmware that can provision the device boot. For example, boot ROM on the device can cryptographically verify the firmware against a known good key before letting it out of boot. Another example is, hardware on the device cryptographically measures the firmware at startup and makes the measurements available to all security components of the device including DICE. Such cryptographic measurements made by the hardware are non-modifiable by any other component on the device, till the device resets.

In block 520, the hardware receives a request from firmware for UDS provisioning.

In block 530, it may be determined whether the firmware was verified. For example, the hardware on the device may determine whether the firmware was able to be verified or not (Secure Boot).

If the firmware was deemed to be allowed to provision UDS by hardware, in block 540 the hardware provisions the UDS. In block 550, the hardware and/or DICE ensures that the only CDI available to the firmware is based on the verification. For example, the hardware and/or DICE prevents firmware from accessing a CDI generated from the UDS unless it is the same firmware used at boot-up. For example, DICE reads measurements made at the time of boot, and automatically creates a CDI corresponding to the firmware that booted. Other examples of security measures that the device can take to ensure that only correct CDI is made available to the firmware, include, resetting the device after UDS is provisioned, only allowing UDS provisioning when Secure Boot has been enabled and enforced by the hardware before letting the firmware that is requesting UDS provisioning to boot, or other actions. In other examples, the action may include having the DICE on the device be locked by the hardware when UDS is not provisioned, so even when firmware provisions the UDS, DICE is not available until a next reset.

If the firmware was not deemed to be allowed to provision UDS by hardware, in block 560 the hardware on the device may take security measures. Such security measures can include, for example, refusing to boot, locking access to storage areas, or any other action that would prohibit malicious provisioning. In this regard, if an attacker runs firmware that can maliciously provision and leak the UDS, hardware will refuse to run that firmware.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of ensuring secure provisioning of a root-of-trust device, comprising:
    verifying, using hardware on the root-of-trust device, firmware to be used for provisioning during a boot process;
    if the firmware is verified, allowing firmware to write unique device secrets; and
    if the firmware is not verified, taking, by the hardware, one or more security measures, wherein taking one or more security measures comprises refusing to boot.

2. The method of claim 1, wherein if the firmware is verified, the method further comprises:
    obtaining, by a device identifier composition engine, firmware measurements; and
    generating a composite device identifier based on the firmware measurements and the unique device secrets.

3. The method of claim 1, wherein taking one or more security measures comprises locking access to storage areas.

4. The method of claim 1, wherein taking one or more security measures comprises refusing to run the firmware.

5. The method of claim 1, wherein the root-of-trust device is a root-of-trust chip.

6. The method of claim 1, further comprising preventing access to a composite device identifier or unique device secrets by any firmware that they were not intended for.

7. A method of ensuring secure provisioning of a root-of-trust device, comprising:
    writing, by hardware on the root-of-trust device, unique device secrets;
    detecting, by the hardware on the root-of-trust device, a request from firmware for provisioning; and
    performing, by at least one of the hardware or a device identifier composition engine, one or more security measures preventing the firmware from reading provisioned unique device secrets or any composite device identifier that is not meant to be accessed by the loaded firmware, wherein the one or more security measures comprises having the device identifier composition engine on the device be locked by the hardware when unique device secret is not provisioned.

8. The method of claim 7, wherein the hardware on the root-of-trust device comprises a boot read only memory.

9. The method of claim 7, wherein the one or more security measures comprises resetting the root-of-trust device after the unique device secrets are provisioned.

10. The method of claim 7, wherein the one or more security measures comprises allowing unique device secrets provisioning only when a secure boot mechanism is enabled and enforced by the hardware before the firmware boots.

11. The method of claim 7, wherein the one or more security measures comprises the device identifier composition engine automatically taking the measurements made at the time of boot, and automatically creating a composite device identifier corresponding to the firmware that booted.

12. The method of claim 11, wherein the firmware is not validated by the hardware.

13. The method of claim 11, wherein the firmware is validated by the hardware.

14. A system for ensuring secure provisioning of a root-of-trust device, comprising:
    memory;
    one or more processors in communication with the memory, the one or more processors configured to:
    write unique device secrets or verify firmware to be used for writing unique device secrets during a boot process; and
    prevent unintended or unverified firmware from provisioning, wherein preventing unverified firmware from provisioning comprises refusing to boot.

15. The system of claim 14, wherein if the firmware is verified, the one or more processors allow the firmware to write the unique device secrets.

16. The system of claim 14, wherein preventing unverified firmware from provisioning comprises locking access to storage areas.

17. The system of claim 14, wherein preventing unintended firmware from provisioning comprises resetting the root-of-trust device after the unique device secrets are provisioned.

18. The system of claim 14, wherein preventing unintended firmware from provisioning comprises allowing unique device secrets provisioning only when a secure boot mechanism is enabled and enforced by the one or more processors before the firmware boots.

* * * * *